(12) United States Patent
Wei et al.

(10) Patent No.: US 7,353,312 B2
(45) Date of Patent: Apr. 1, 2008

(54) METHOD AND APPARATUS FOR DETECTING CONDITIONS FOR BLOCKING A CPU'S RECEIPT OF SIGNALS RETURNED FROM A PERIPHERAL DEVICE

(75) Inventors: Ray Wei, Hsin-Tien (TW); Wayne Huang, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 24 days.

(21) Appl. No.: 11/267,126

(22) Filed: Nov. 7, 2005

(65) Prior Publication Data
US 2006/0294276 A1    Dec. 28, 2006

(30) Foreign Application Priority Data
Jun. 28, 2005    (TW)    ............... 94121680 A

(51) Int. Cl.
*G06F 13/24*    (2006.01)
(52) U.S. Cl. .............. 710/267; 710/268; 710/262; 710/269
(58) Field of Classification Search ........ 710/260–269, 710/48–50, 311–315, 300–306
See application file for complete search history.

(56) References Cited
U.S. PATENT DOCUMENTS
5,623,673 A *   4/1997   Gephardt et al. ........... 710/260

5,729,760 A     3/1998   Poisner
2005/0120154 A1*  6/2005   Ho et al. ................... 710/260

FOREIGN PATENT DOCUMENTS
CN    1228177    9/1999

OTHER PUBLICATIONS
"System Management Mode"; Transmeta Corporation; Apr. 25, 2002.

* cited by examiner

*Primary Examiner*—Raymond N Phan
(74) *Attorney, Agent, or Firm*—Rosenberg, Klein & Lee

(57) ABSTRACT

A method for determining blocking signals is used to judge whether to block a return signal transmitted to a CPU or not when a system management interrupt (SMI) signal is transmitted to the CPU, wherein the return signal is a signal transmitted by a system chip in response to a triggering command transmitted to the system chip by the CPU. The blocking method includes detecting whether the CPU has transmitted the triggering command to the system chip, and detecting whether the system management interrupt signal is transmitted to the CPU. When the CPU has transmitted the triggering command to the system chip, and subsequently the system management interrupt signal has been transmitted to the CPU, it is judged that the system management interrupt signal is used to extract the values in registers of a computer system. Thereby the return signal transmitted to the CPU is blocked.

16 Claims, 4 Drawing Sheets

METHOD AND APPARATUS FOR DETECTING CONDITIONS FOR BLOCKING A CPU'S RECEIPT OF SIGNALS RETURNED FROM A PERIPHERAL DEVICE

FIELD OF THE INVENTION

The present invention relates generally to a method and an apparatus for determining blocking signals, and more particularly to a method and an apparatus for determining whether to block a return signal transmitted to a CPU (Central Processing Unit) or not when a system management interrupt signal is transmitted to the CPU.

BACKGROUND OF THE INVENTION

With the progress of computer technologies, the number of peripheral devices connected to a computer increases. Consequently the complexity of a computer system increases as well, which results in a demand in a more complicated system debugging in order to enhance stability of the computer system and to avoid system abnormal situations occurred during system operations. With the advancement of system debugging technologies, it is developed nowadays that by prompting the CPU to execute system management mode (SMM) in order to extract data in the registers of a computer system by means of triggering system management interrupt (SMI) via software by testing personnel, the state when an error is occurred in the computer system can be known and thereby the cause of the error in the computer system can be analyzed.

When a CPU is in the system management mode and data extraction from registers is not finished, if a return signal, such as one transmitted by a south bridge chip, is transmitted to the CPU, the CPU will modify the data stored in the registers of the computer system because a return signal is transmitted by system chip in order to reply the CPU that the execution event launched by the CPU's triggering command has been completed. As a result, instead of the data desired by testing personnel, the extracted data stored in the registers can possibly be data modified by the CPU, which will impair testing personnel debugging the computer system. Consequently, it is necessary to block return signals transmitted to the CPU until the completion of data extraction from registers when a CPU receives a system management interrupt signal and switches to the system management mode.

In addition, a system management interrupt signal can also be triggered by peripheral devices. Since the system management interrupt signal is not used for data extraction from registers, it is not necessary to block the return signal transmitted to the CPU. Currently, the method for determining blocking signals is to check the status registers of all peripheral devices and to identify if the system management interrupt signal is triggered by peripheral devices. If not, it means that the system management interrupt signal is triggered by software and thereby it is necessary to block the return signal transmitted to the CPU. However, the foregoing process of individually identifying status registers is quite time-consuming, and consumes hardware resources and costs in a computer system. Besides, at present day there is another method for blocking return signals, which, regardless of a system management interrupt signal triggered by peripheral devices or by software, blocks return signals directly. In this way, the computer system is prone to failure.

Accordingly, the present invention provides a method and an apparatus for blocking signals in order to solve the problems as described above. The method and the apparatus can easily judge if a system management interrupt signal is triggered by software for the purpose of data extraction from registers. Thereby a return signal can be determined to be blocked or not.

SUMMARY OF THE INVENTION

The purpose of the present invention is to provide a method and an apparatus for determining blocking signals, which can judge if a system management interrupt signal is triggered by software to extract data in registers. Thereby a return signal transmitted to a CPU can be blocked in order to extract correct data in registers.

Another purpose of the present invention is to provide a method and an apparatus for determining blocking signals, which, by means of easy judgment method, determines whether to block return signal transmitted to a CPU in order to enhance the efficiency of determining blocking signals.

The method and an apparatus for determining blocking signals in the present invention is applied to determine whether to block return signal transmitted to a CPU or not when a system management interrupt signal is transmitted to the CPU. The present invention comprises a detecting unit for determining blocking signals firstly detects if the CPU has transmitted a triggering command to a systems chip. If the triggering command transmitted by the CPU to the system chip is detected, then the detecting unit detects if a system management interrupt signal is transmitted to the CPU. If a system management interrupt signal is transmitted to the CPU, it is judged that the system management interrupt signal is used to extract data in registers. Thereby it is determined to block a return signal transmitted to the CPU such that modifications of the data stored in the registers by the CPU can be avoided in order to extract correct data in the registers.

In order to make the structure and characteristics as well as the effectiveness of the present invention to be further understood and recognized, the detailed description of the present invention is provided as follows along with preferred embodiments and accompanying figures.

DETAILED DESCRIPTION OF THE PREFERRED EMBODIMENT

Figure 1:
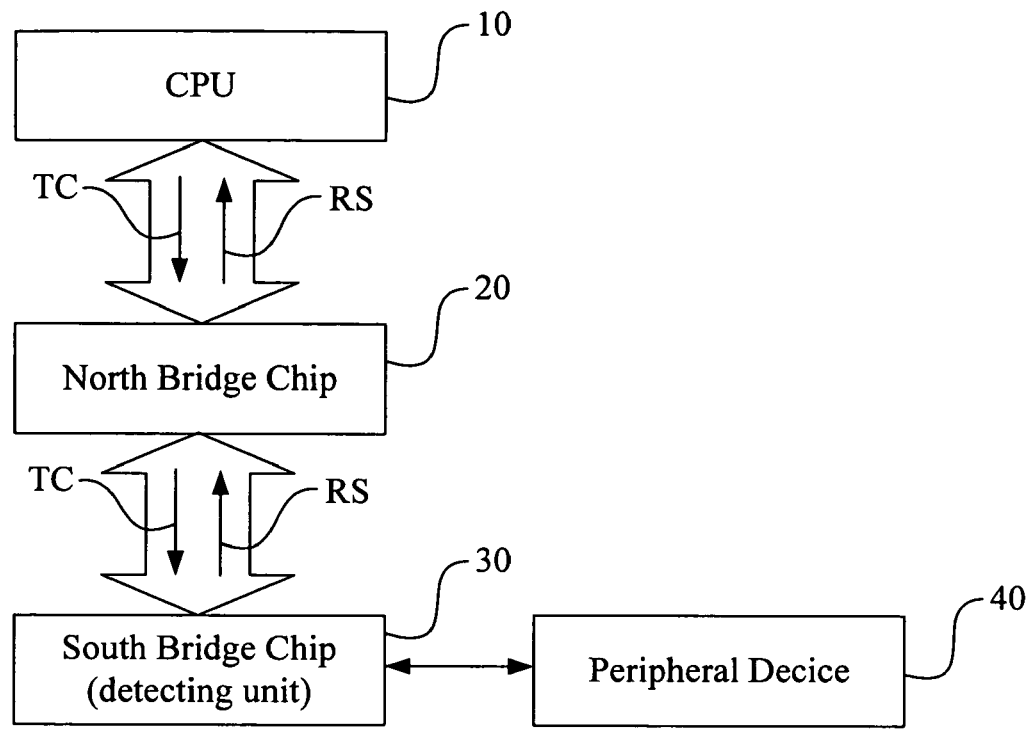
FIG. 1 shows a block diagram of a preferred embodiment of the present invention.

Please refer to FIG. 1. The figure shows a block diagram of a preferred embodiment of the present invention. As shown in the figure, the present invention comprises a CPU 10, a north bridge chip 20, a south bridge chip 30, and a peripheral device 30, wherein the south bridge chip 30 is used as a system chip. The CPU 10 transmits a triggering command TC to the south bridge chip 30 through the north bridge chip 20 for driving the peripheral device 30 to execute event. The south bridge chip 30 transmits a return signal RS to the CPU 10 through the north bridge chip 20 for replying the CPU 10 when the peripheral device 30 has completed the event according to the CPU's triggering command TC. The CPU 10 executes a system management mode in order to extract data in the registers of a computer system by means of triggering the south bridge chip 30 to transmit a system management interrupt signal to the CPU 10 via software by testing personnel.

Figure 2:
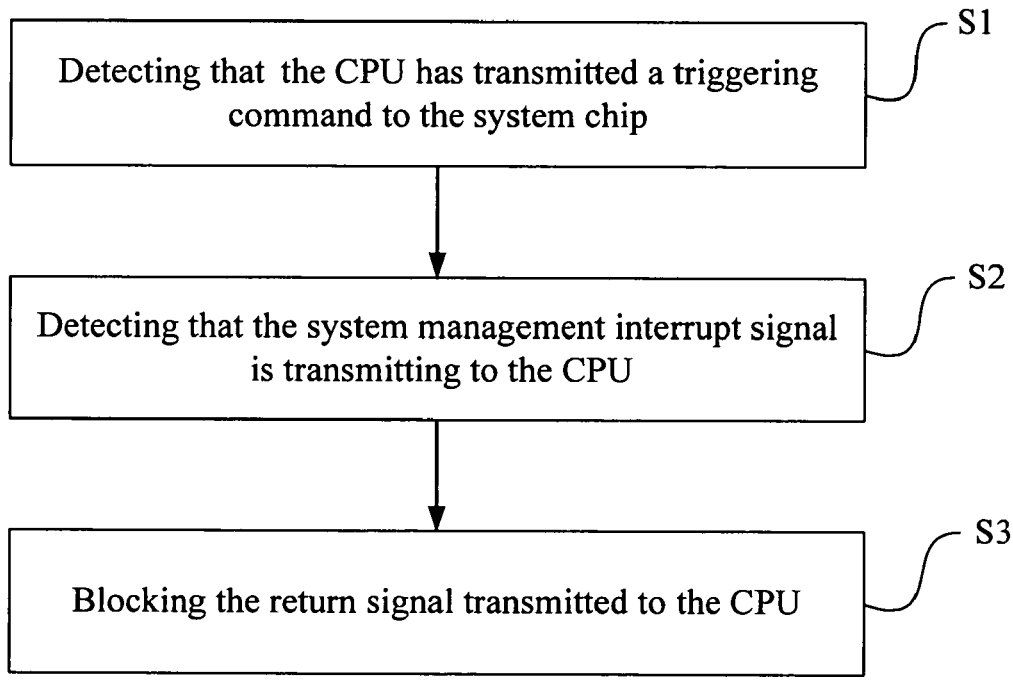
FIG. 2 shows a flowchart of a preferred embodiment of the present invention.

Please refer to FIG. 2. The figure shows a flowchart of a preferred embodiment of the present invention. As shown in the figure, the south bridge chip 30 executes the first step S1, detecting whether the CPU has transmitted the triggering command TC to the system chip, where the system chip is the south bridge chip 30. When the triggering command TC transmitted by the CPU 10 to the south bridge chip 30 is detected, step S2 is executed to detect by the south bridge chip 30 if the system management interrupt signal is triggered to be transmitted to the CPU 10. When the system management interrupt signal is scheduled to transmit to the CPU 10, the south bridge chip 30 judges that the system management interrupt signal transmitting to the CPU 10 is triggered by testing personnel via software, such that the CPU 10 can be driven to execute system management mode in order to extract data in registers. Thereby the south bridge chip 30 executes step S3 to block the return signal RS transmitted to the CPU 10 until the CPU 10 has completed executing the system management mode.

The approach of blocking the return signal RS can be achieved by the south bridge chip 30 transmits a blocking signal to the CPU 10 through the north bridge chip 20 to drive the CPU 10 not to receive the return signal RS. This way, correct data, but not modified data, can be extracted from the registers for the testing personnel to debug.

As the above mentions, the south bridge chip 30 could be a detecting unit for detecting whether the CPU 10 has transmitted the triggering command TC and detecting whether the system management interrupt signal is transmitted to the CPU 10. Wherein, the detecting unit blocks the return signal RS from the south bridge chip 30 to the CPU 10 if the CPU 10 has transmitted the triggering command TC to the south bridge chip 30 and the system management interrupt signal has been transmitted to the CPU 10.

Figure 3:
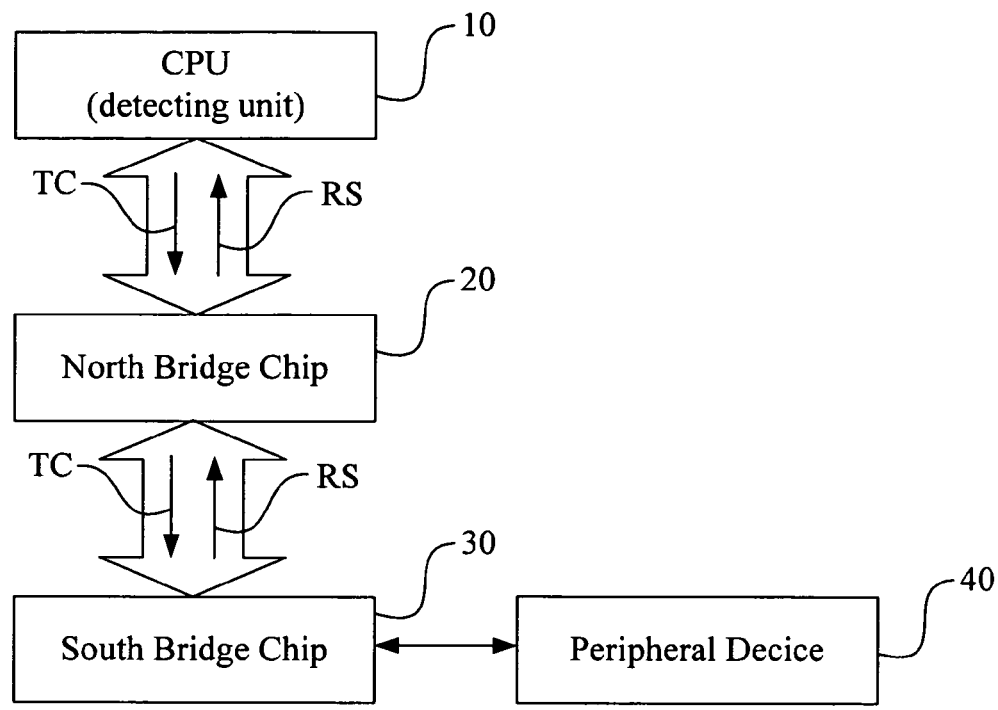
FIG. 3 shows a block diagram of another preferred embodiment of the present invention.

Please refer to FIG. 3. The figure shows a block diagram of another preferred embodiment of the present invention. As shown in the figure, the CPU 10 of the present invention is used as the detecting unit for determining blocking signals. The CPU 10 blocks the return signal RS from the south bridge chip 30 to the CPU 10 by transmitting the blocking signal to the south bridge chip 30 through the north bridge chip 20, when the CPU 10 executes the step S1 and the step S2. The CPU 10 has transmitted the triggering command TC to the south bridge chip 30 and the system management interrupt signal has been transmitted to the CPU 10. Wherein the blocking signal drives the south bridge chip 30 not to send the return signal.

Figure 4:
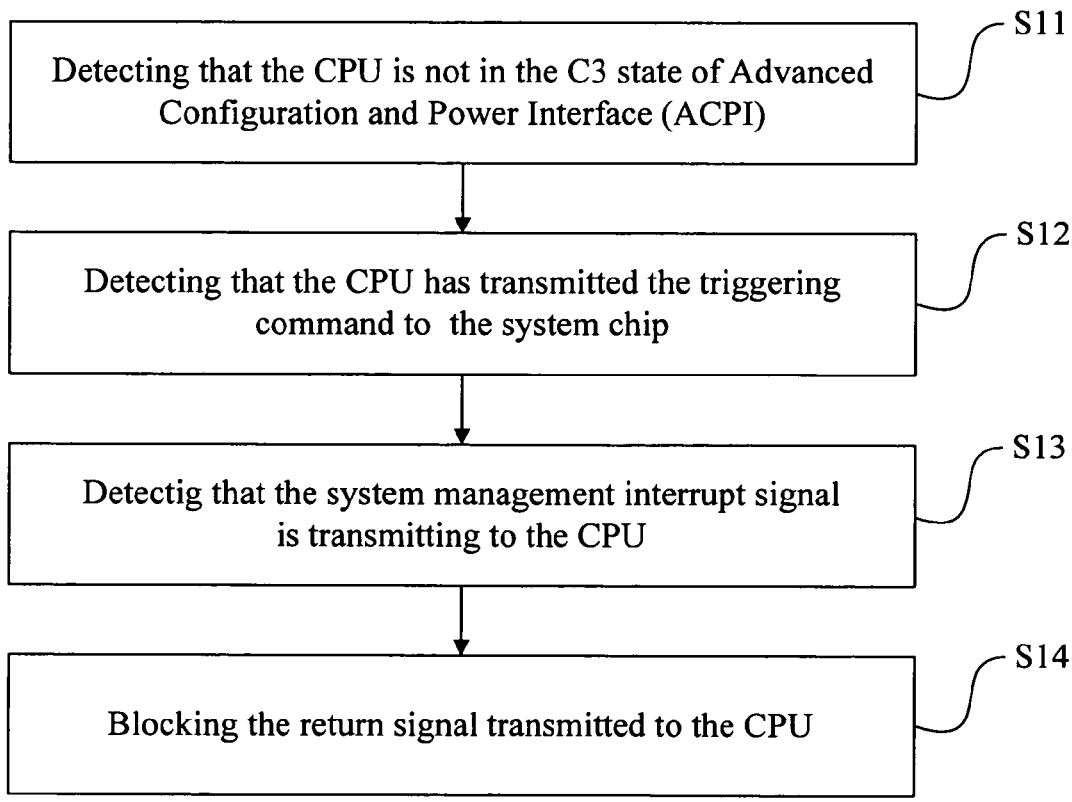
FIG. 4 shows a flowchart of another preferred embodiment of the present invention.

Please refer to FIG. 4. FIG. 4 shows a flowchart of another preferred embodiment of the present invention which considers the power state of CPU 10. Because when the CPU 10 is in a C3 state of the Advanced Configuration and Power Interface (ACPI), the software will not assert to initialize the system management interrupt signal. Thereby the determination method according to the present invention can further add a step. As shown in step S11, whether the CPU 10 is in the C3 state of ACPI is detected firstly. If the CPU 10 is in the C3 state of ACPI, no further detection steps are executed. However, if the CPU 10 is detected not in the C3 state of ACPI, then the step S12 is followed to be executed to detect if the CPU 10 transmits the triggering command TC to the system chip. If yes, then the step S13 is followed to be executed to detect if the system management interrupt signal is transmitting to the CPU 10. If yes, the step S14 is executed to block the return signal RS transmitted to the CPU 10.

Figure 5:
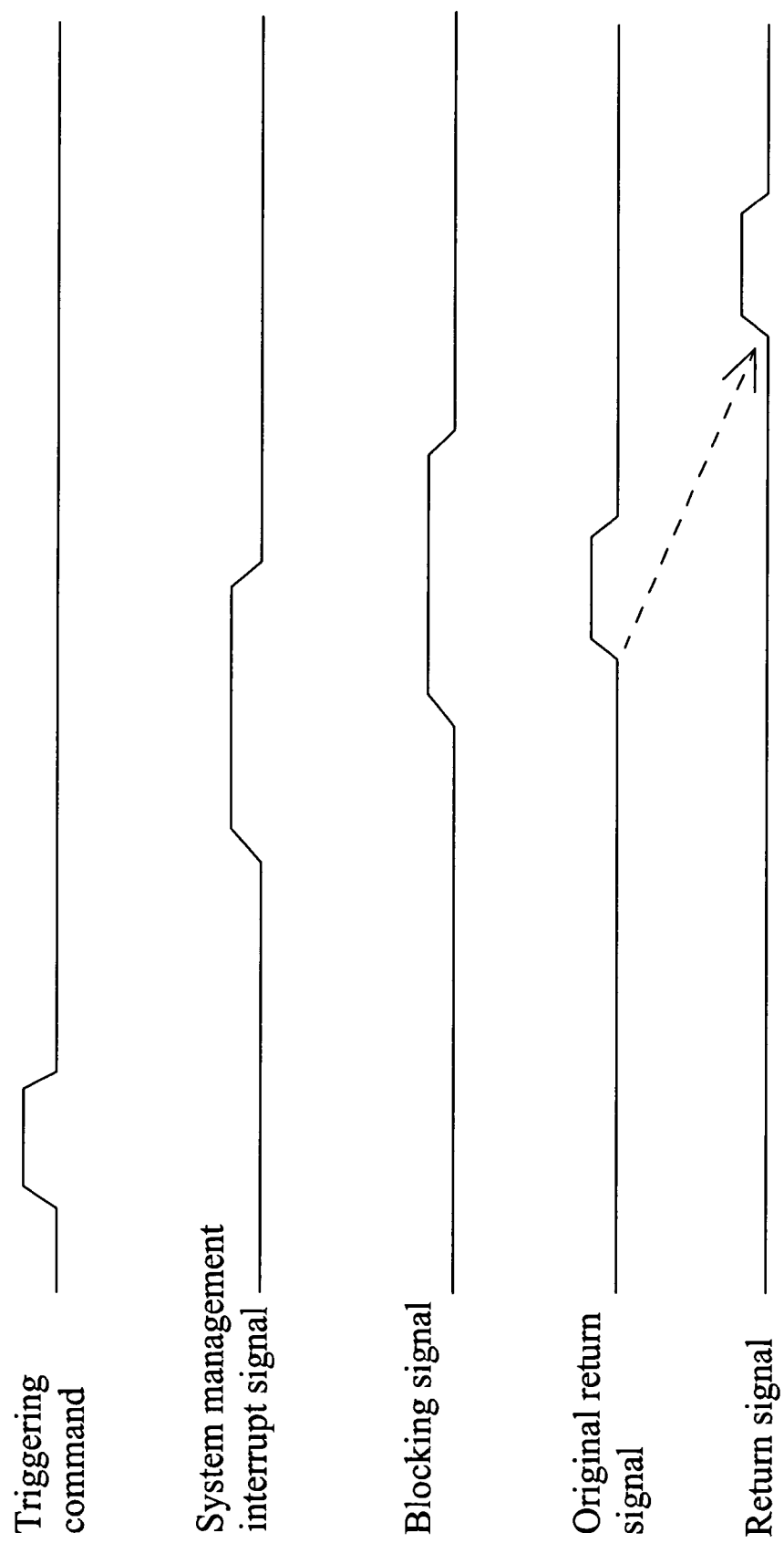
FIG. 5 shows a timing diagram of a preferred embodiment of the present invention.

Please refer to FIG. 5. FIG. 5 shows a timing diagram of a preferred embodiment of the present invention. As shown in the figure, after the CPU 10 transmits the triggering command to the south bridge chip 30, if the system management interrupt signal is triggered and transmitted to the CPU 10, according to the present invention, it is judged that the system management interrupt signal is triggered by an extraction signal generated by testing personnel via software. Therefore, the blocking signal is triggered in order to block the original return signal transmitted to the CPU 10 until the system management mode is completed. When the CPU 10 has completed executing the system management mode, the extraction of data from registers is finished. Therefore, the original return signal is stopped blocking and is transmitted to the CPU 10.

Figure 6:
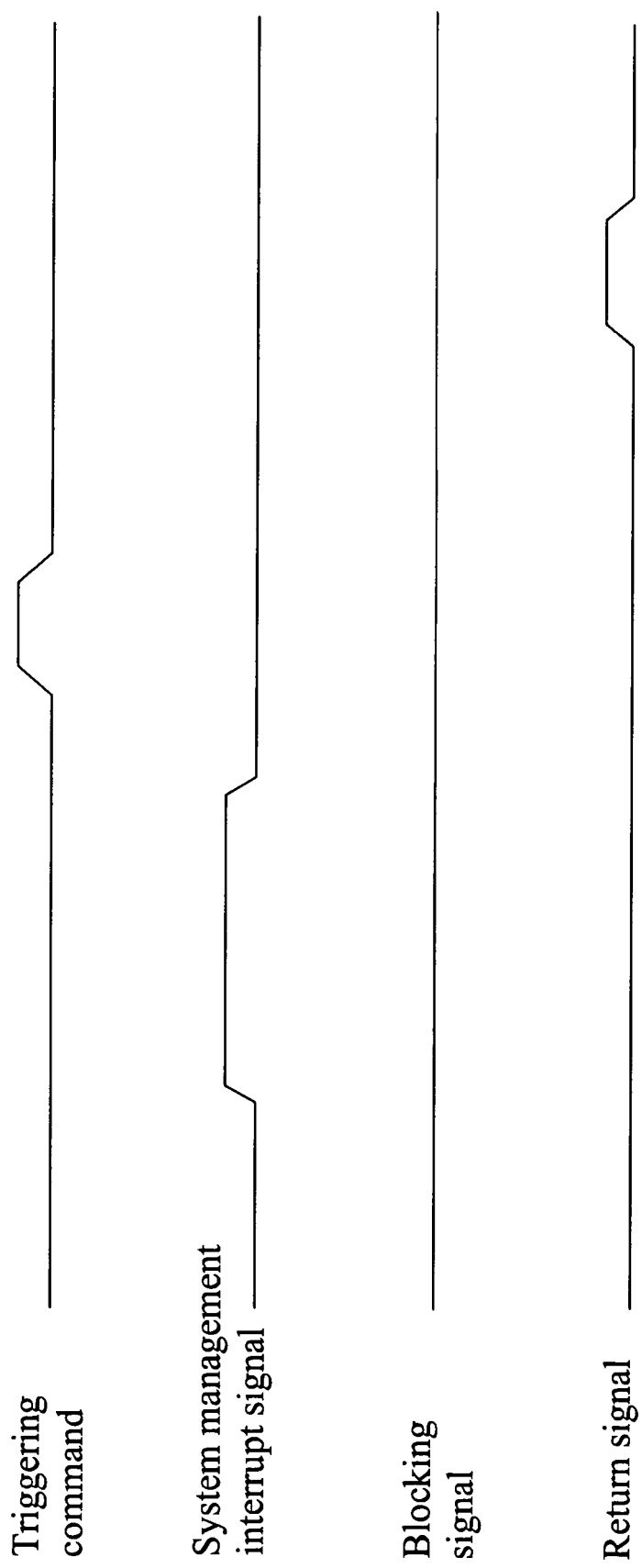
FIG. 6 shows another timing diagram of a preferred embodiment of the present invention.

Please refer to FIG. 6. The figure shows another timing diagram of a preferred embodiment of the present invention. As shown in the figure, if the system management interrupt signal is triggered firstly and transmitted to the CPU 10 before the CPU 10 sending the triggering command to the south bridge chip 30, according to the present invention, it is judged that the system management interrupt signal is triggered by peripheral devices 40. Thereby it is not necessary to trigger the blocking signal to block the return signal transmitted to the CPU 10. The reason is that after testing personnel has triggered the system management interrupt signal via software, it is not likely to send command via software to the CPU 10 in order to transmit the triggering command. Hence, in this situation, it is judged that the system management interrupt signal is triggered by peripheral devices 40. Thereby it is not necessary to trigger the blocking signal to block the return signal transmitted to the CPU 10.

According to the above descriptions, by means of the easy judgment method according to the present invention, whether to block the return signal transmitted RS to the CPU 10 can be determined easily and rapidly. The present invention is different from the prior-art method, which has to detect the values in the registers of the computer system individually in order to judge if the system management interrupt signal is triggered by software or not, and then to determine if the return signal RS transmitted to the CPU 10 should be blocked. Consequently, the present invention provides the ability of increasing the efficiency of determining blocking return signal RS, and hence lowers hardware costs.

To sum up, the method for determining blocking signals according to the present invention judges a system management interrupt signal to be used for driving a CPU to execute system management mode in order to extract data from registers of a computer system if the CPU transmits a triggering command to a system chip and the system management interrupt signal is transmitted to the CPU. Thereby the method determines a return signal to be transmitted to the CPU in order to prevent the CPU from modifying data in registers for testing personnel to execute debugging of a computer system, otherwise the extracted data will be false. By means of the method according to the present invention, it is easy to judge if the return signal should be blocked. Consequently, the present invention provides the advantages of high efficiency and low hardware costs.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for determining whether to block a return signal transmitted to a CPU, comprising the steps of:
   detecting whether the CPU has transmitted a triggering command to a system chip;
   detecting whether a system management interrupt signal is transmitted to the CPU;
   if the triggering command is detected and the system management interrupt signal is detected subsequent to the triggering command, then the system chip blocks the return signal transmitted to the CPU; and
   otherwise the system chip transmits the return signal to the CPU.

2. The method of claim 1, wherein the step of detecting whether the CPU has transmitted a triggering command to a system chip is preceded by the steps of detecting whether the CPU is in a C3 state of an advanced configuration and power interface (ACPI), and if the CPU is in the C3 state, then proceeding to step of otherwise the system chip transmitting the return signal to the CPU.

3. The method of claim 1, wherein after the step of the system chip blocking the return signal transmitted to the CPU if the triggering command is detected and the system management interrupt signal is detected subsequent to the triggering command, the method further comprises the step of transmitting the return signal to the CPU when the CPU has completed executing a system management mode corresponding to the system management interrupt signal.

4. The method of claim 1, wherein the step of blocking the return signal transmitted to the CPU includes the step of extracting data from a plurality of registers in a computer system.

5. The method of claim 1, wherein said system chip is a south bridge chip.

6. A method for determining whether to block a return signal to a CPU, comprising the steps of:
   sending a triggering command from a CPU to a system chip;
   sending a system management interrupt signal from the system chip to the CPU;
   executing a system-management-mode by the CPU for extracting data from a plurality of registers in a computer system; and
   blocking a returning signal transmitted responsive to the triggering command from the system chip to the CPU until the system-management-mode is completed.

7. The method of claim 6, wherein the step of sending a triggering command is preceded by the step of determining that said CPU is not in a C3 state of an advanced configuration and power interface (ACPI).

8. The method of claim 6, wherein said system chip is a south bridge chip.

9. An apparatus for blocking return signals in a system-management-mode, comprising:
   a detecting unit for detecting whether a CPU has transmitted a triggering command to a system chip, detecting whether a system management interrupt signal is transmitted to the CPU, and blocking a return signal in response to the triggering command transmitted from the system chip, if the detecting unit has detected that the CPU has transmitted the triggering command to the system chip and the system management interrupt signal has been transmitted to the CPU.

10. The apparatus of claim 9, wherein said detecting unit could be the system chip blocking the return signal transmitted to the CPU when the system chip detects the CPU has transmitted the triggering command and the system management interrupt signal has been transmitted to the CPU.

11. The apparatus of claim 9, wherein said detecting unit could be the CPU blocking the return signal transmitted to the CPU when the CPU has transmitted the triggering command and the system management interrupt signal has been transmitted to the CPU.

12. The apparatus of claim 9, wherein said detecting unit precedes detecting whether the CPU has transmitted the triggering command to the system chip by detecting whether the CPU is in a C3 state of an advanced configuration and power interface (ACPI), and if true then inhibits the return signal from being blocked.

13. The apparatus of claim 9, wherein said detecting unit ceases to block the return signal when the CPU has completed executing a system management mode corresponding to the system management interrupt signal.

14. The apparatus of claim 9, wherein said system chip is a south bridge chip.

15. The apparatus of claim 10, wherein said system chip sends a blocking signal to the CPU to drive the CPU not to receive the return signal.

16. The apparatus of claim 11, wherein said CPU sends a blocking signal to the system chip to drive the system chip not to send the return signal.

* * * * *